United States Patent [19]

Klein

[11] 4,304,873
[45] Dec. 8, 1981

[54] PREPARATION OF EXPANDED FLEXIBLE POLYURETHANE FOAM MICRO-BITS

[76] Inventor: Max Klein, 257 Riveredge Rd., Tinton Falls, N.J. 07724

[21] Appl. No.: 144,229

[22] Filed: Apr. 28, 1980

Related U.S. Application Data

[60] Division of Ser. No. 833,643, Sep. 15, 1977, Pat. No. 4,200,679, which is a continuation-in-part of Ser. No. 342,535, Sep. 16, 1973, abandoned.

[51] Int. Cl.$^3$ ............................................. B32B 27/40
[52] U.S. Cl. ..................................... 521/53; 162/146; 162/164 R; 428/402; 428/407; 241/23; 241/27; 521/61; 521/902; 521/918; 528/502; 528/902
[58] Field of Search ............................ 162/146, 164 R; 521/918, 61, 53; 528/502, 902; 241/23, 27

[56] References Cited

U.S. PATENT DOCUMENTS

| | | | |
|---|---|---|---|
| 2,983,692 | 5/1961 | D'Alelio | 260/2.5 B |
| 3,038,867 | 6/1962 | Czepiel | 260/2.5 |
| 3,164,559 | 1/1965 | Eberl et al. | 260/2.5 |
| 3,255,127 | 6/1966 | Von Bonin | 260/2.5 B |
| 3,371,053 | 2/1968 | Raskin | 260/2.5 B |
| 3,472,801 | 10/1969 | Lerman et al. | 260/2.5 B |
| 3,597,312 | 8/1971 | Kohne et al. | 162/146 |
| 3,607,999 | 9/1971 | Corbett et al. | 428/407 |
| 3,618,618 | 11/1971 | Strickman | 521/918 |
| 3,630,820 | 12/1971 | Leach | 428/402 |
| 4,200,679 | 4/1980 | Klein | 521/918 |
| 4,207,378 | 6/1980 | Klein | 521/918 |
| 4,230,566 | 10/1980 | Faudree | 521/99 |

FOREIGN PATENT DOCUMENTS

| | | |
|---|---|---|
| 922306 | 3/1963 | United Kingdom . |
| 1058932 | 2/1967 | United Kingdom . |
| 1194492 | 6/1970 | United Kingdom . |

OTHER PUBLICATIONS

Fitzpatrick Co., Bulletin No. 152, "Model D Comminuting Machine", Elmhurst (Illinois), 8 pp., 1968.

*Primary Examiner*—H. S. Cockeram
*Attorney, Agent, or Firm*—Dann, Dorfman, Herrell and Skillman

[57] ABSTRACT

The preparation of flexible polyurethane foam micro-bits by the comminution of a flexible polyurethane foam in the presence of a compatible protective cooling fluid under specific comminuting steps and conditions.

6 Claims, 7 Drawing Figures

PREPARATION OF EXPANDED FLEXIBLE POLYURETHANE FOAM MICRO-BITS

This application is a division of my copending application Ser. No. 833,643 filed Sept. 15, 1977 issuing as U.S. Pat. No. 4,200,679 on Apr. 29, 1980, which application was in turn a continuation-in-part application of my then copending application Ser. No. 342,535 filed Sept. 16, 1973 (now abandoned).

Various attempts have been made to produce particulate synthetic polymers derived from expanded polymers or polymer solutions for use in the paper-making industry as modifiers to improve or modify the properties of the fibrous paper products. These particulate synthetic polymer products of the prior art have met with limited commercial success either because of cost or incompatibility with standard paper-making processes and formulations. Generally, the use of a particulate polymer in a fibrous paper formulation results in decreased tensile and tear strength properties of the modified product.

One attempt to use a particulate synthetic polymer as a modifier in a paper product is described in U.S. Pat. No. 3,038,867. A "semi rigid" urea-formaldehyde foam is prepared and disintegrated. In order to process a mixture of this disintegrated aminoplast resin and wood pulp on paper-making equipment it was necessary to de-aerate the mixture. No physical properties on tensile or tear strength are reported. However, the required de-aeration step indicates that the disintegrated foam contained sufficient cell structure to entrap air and cause flotation of the disintegrated foam from the wood pulp component of the paper-making formulation which in turn caused the processing problem reported in Example 1 of the patent.

A second attempt to produce a particulate polymeric modifier is described in U.S. Pat. No. 3,597,312. A particulate or fibrous polystyrene is prepared according to this patent by precipitating a solution of polystyrene in a non-solvent such as pentane. The resulting precipitate is recovered and extracted with non-solvent to remove entrapped solvent; the extraction step is then followed by drying of the polymer to remove the non-solvent. This process is costly and to some extent dangerous because it involves the use and recovery of large quantities of potentially explosive and relatively expensive organic solvents.

Another attempt to produce a particulate foamed urea-formaldehyde resin suitable for use in paper making is described in U.S. Pat. No. 3,164,559. At this point the art had come to recognize that granular particulates exhibited little or no mechanical binding attraction for the fibrous substances with which they were to be combined. The patent describes an attempt to use a flexible urea-formaldehyde resin as the starting material for making a paper additive. The inventors solved the problem of grinding such a flexible material by compressing it under temperature and pressure until such densification eliminated the resilient property of the polymer which interfered with the grinding operation. The product of this process is deficient in that its addition to a paper-making formulation caused a major reduction in tensile and breaking strength.

SUMMARY OF THE INVENTION

This invention is that of the method of preparing the novel polymeric structure, termed flexible polyurethane foam micro-bits, by comminuting a flexible polyurethane foam in the presence of a compatible protective cooling fluid, for example, a liquid inert to the flexible polyurethane foam, conveniently water.

The structure of the products of this invention is adapted for use in paper-making formulations and processes to improve the tear and tensile strength of the modified paper.

DETAILED DESCRIPTION OF THE INVENTION

The method of this invention prepares the micro-bit products from flexible polyurethane foams. The preparation and properties of flexible polyurethane foams are well known and are based on the reaction of a di-isocyanate or polyisocyanate with a polyol and a blowing agent (usually water).

The preparation of flexible polyurethane foams and their properties are described in the "Handbook of Foamed Plastics", Bender, Rene J., Section X, pp. 137–236, Lake Publishing Corporation, Libertyville, Ill. (1955); "The Development and Use of Polyurethane Foams", Doyle, E. N., pp. 233–256, McGraw Hill Book Company (1971); and "Polyurethanes: Chemistry and Technology", Saunders and Frisch, Chapter VII, Part II, Interscience Publishers (1964).

The flexible polyurethane foams useful in the method of this invention are further characterized by excellent recovery after 75% deflection (approximately less than 1% loss in height). The mechanical properties of flexible polyurethane foams are determined in accordance with ASTM D-1564-64T.

The density of the flexible polyurethane foams useful in the method of this invention should not be greater than 6.0 pounds per cubic foot, preferably in the range of from about 3.0 pounds per cubic foot to about 1.0 pound per cubic foot.

Flexible polyurethane foams are soft, resilient materials and thus they are difficult to comminute to a size adapted for use in the paper industry. The novel micro-bits provided by the method of this invention by feeding shredded pieces of a flexible polyurethane foam into a confined comminuting zone while simultaneously introducing into said comminuting zone sufficient cooling and dispersing medium, generally water, to prevent the temperature from reaching a level that would adversely affect the contents of the comminuting zone or the comminuting process and equipment. The temperature should be maintained below that which could degrade the polyurethane and is preferably kept and below 149° C. The process may be carried out at ambient workroom temperature.

Figure 1:
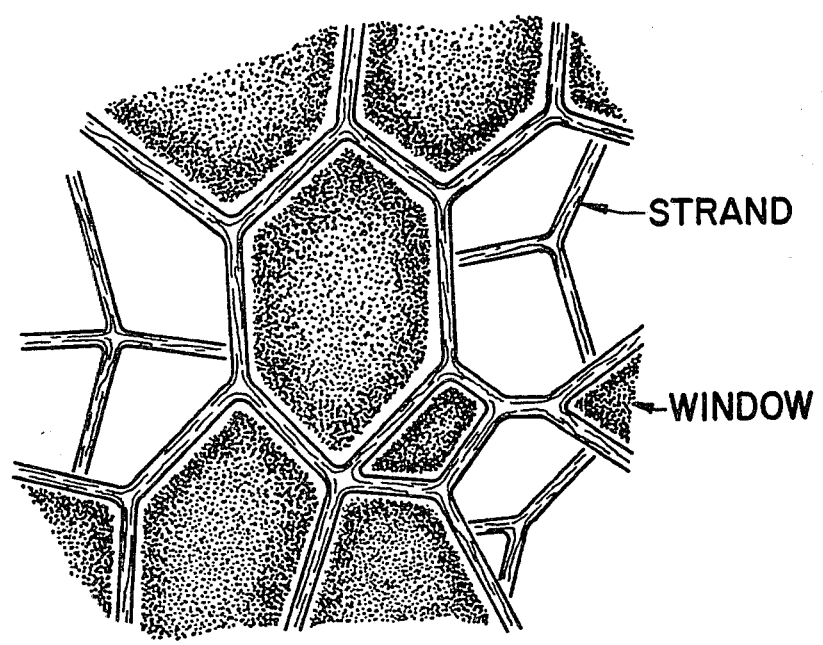
FIG. 1 is an illustration of a section of several cells of the flexible polyurethane foam, depicting the strand and window portions of the individual cell.

The structure of a flexible polymeric urethane foam may be generally described as an interconnected mass of bubbles which have been distorted into polyhedra form. The polymer is distributed between the walls of the bubbles and the lines where bubbles intersect, with most of the polymer at the intersections. For the purpose of this description the bubbles are called "cells", the lines of cell intersections are called "strands" and the walls between cells are called "windows". FIG. 1 illustrates the structure of a flexible polyurethane foam and its just defined component parts.

Figure 5:
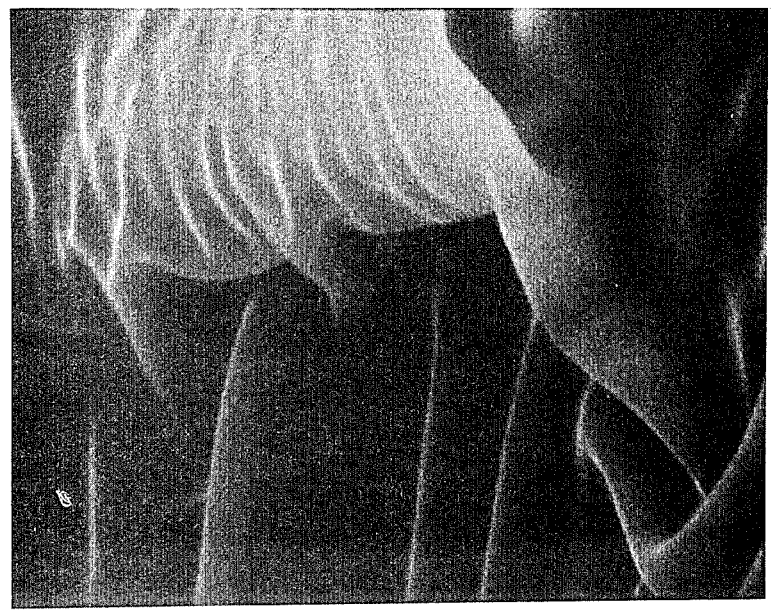
FIG. 5 is a SEM, at a magnification of 10,000, of the central left-hand portion of FIG. 4 showing the fluted structure emanating from the strand portion of the micro-bit product and running vertically downwardly towards the remnant of the cell window portion of the micro-bit product of this invention.
Figure 6:
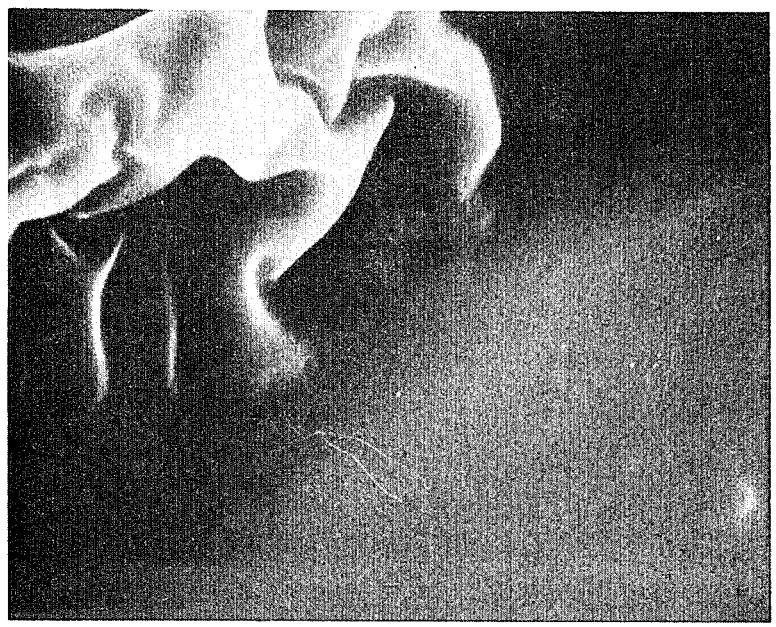
FIG. 6 is a SEM, at a magnification of 15,000, showing the end of the fluted structure of FIG. 5 where it merges into the remnant of the cell window portion of the micro-bit product of this invention.
Figure 7:
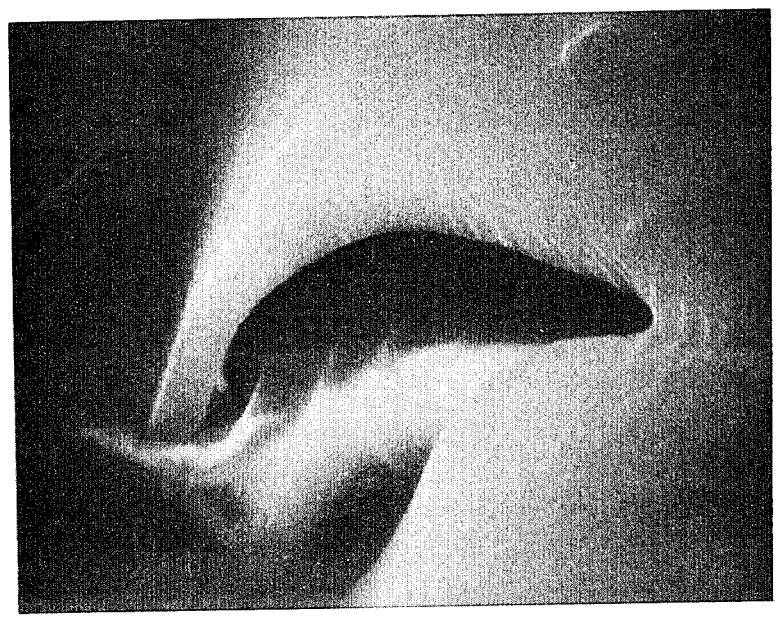
FIG. 7 is a SEM, at a magnification of 5,000, showing the thickness of the remnant of the cell window of the micro-bits of this invention.

Comminution of a flexible polyurethane foam in accordance with the process of this invention produces a novel structure which consists of one or more strand portions to which are attached fragments of the windows. The fragments of the windows produce a series of jagged hook-like projections and indentations on the strand portions. Examination of the drawings shows fluted areas, for example, as seen in FIG. 5, which are believed to have been caused by tearing of the polymeric structure. For the purpose of this description the individual fragment of the broken cell structure is termed a "flexible polyurethane foam micro-bit".

The products of this invention are superior to the particulate synthetic polymers of the prior art because the broken portions of the cell windows provide a series of hook-like projections, indentations and flutes which serve to provide attachment points for the fibers of a paper and thus anchor the polyurethane foam micro-bit into the matrix of the paper's intertwined cellulose fibers.

The polyurethane micro-bits of the method of the invention are prepared by feeding pieces of shredded flexible polyurethane foam and water into a confined comminuting zone, having a feed inlet to it, repeatedly impelling the resulting mixture of the starting pieces of polyurethane in the protective fluid, e.g., water, through a circular path by repeated impact on them in the water by a plurality of impact surfaces spaced apart from one another and rotated around the axis of said circular path at from about 4,700 to about 8,000 revolutions per minute, and at the same time by said impact surfaces driving said pieces to and against cornershaped edges of a dispersed plurality of from substantially circular orifices (a) having a diameter of from about 0.102 to about 3.175 millimeters (i.e. mm.) to substantially rectangular orifices from about 0.254 to about 3.175 mm. in width by from about 3.81 to about 12.7 mm. in length, and (b) being arranged in screening array in an arcuate plane spaced radially out of range of said impact surfaces to an extent that need by only sufficient to avoid collision between said orifices and said impact surfaces, as from about 0.508 to 1.016 mm. and thereby repeatedly tearing, ripping and shearing polyurethane micro-bits from the pieces of flexible polyurethane; said fed-in water being so proportioned to said fed-in pieces of flexible polyurethane foam to prevent the content of the comminuting zone from reaching a temperature that would adversely affect the integrity of said starting pieces and/or of the desired micro-bits.

The preparation of these flexible polyurethane foam micro-bits by the method of the invention, can be conducted by disintegrating the flexible polyurethane foam in a comminuting machine (such as that produced by Fitzpatrick Company, of 832 Industrial Drive, Elmhurst, Ill. 60126, according to their Bulletin No. 152, copyright 1968) using the broached fixed blades (identified therein by "Code DS-225") to replace the blades or other comminuting elements, mounted for rotation in the comminuting chamber model DAS06, both shown on that Bulletin's page 5. That chamber is liquid-tightly capped, for example, by a cover such as shown in their Code M44D6 or Code MA44D6 (upper half of page 3 of their Bulletin 152).

That model DAS06 comminuting chamber is rectangular in horizontal cross-section and has a pair of opposed parallel, entirely vertical walls integrally joined at each of their opposite ends by a separate one of a pair of opposed vertically arcuate walls each with its convex face exposed to the exterior.

Sixteen identical, slat-shaped comminuting arms are separately removably but fixedly carried with their snugly adjacent to one another bases encircled about, and keyed to, the operating shaft and intermediate its free outer mounting ends. These arms extend radially out from the shaft (e.g., 127 mm. from its axis to the outer end of each arm) with the first of each consecutive four of them extending horizontally toward one arcuate wall, the second of each four extending vertically, the third four of them extending toward the other arcuate wall, and the fourth four of them extending vertically downward.

Each arm is rectangular in cross-section in a plane running through the entire length of the shaft's axis and of that arm, and of each arm 180° removed from it. The outer end of each arm meets at right angles with its two wider sides (25.4 mm. width) and its narrow or impact side (9.525 mm. wide) facing the direction of rotation. That narrow side also meets at right angles with the two wider sides which are parallel to one another for most of their width and with the trailing third of their surfaces tapering to one another and terminating in a knife edge of their trailing end.

Each free exposed end of the shaft extends through its respective stuffing box in its neighboring one of the two parallel vertical walls on through a bearing carried on a respective trunnion affixed to the machine's foundation and spaced outwardly away from the respective wall. A driving pulley is mounted on each end of the shaft extending outwardly from its respective mounting trunnion.

The bottom of the comminuting chamber is an exchangeable dish-shaped, arcuate screen curved convexly downward with an inside radius (from the axis of the operating shaft) equal to the length of a comminuting arm plus 0.762 mm. clearance. The screen's overall rectangular peripheral opening has such dimensions and shape to enable it to be removably fitted in a liquid-tight engagement with the bottom of the four walls of the comminuting chamber.

The screen has staggered rows of, for example, circular holes varying in diameter as from 0.102 to about 3.175 mm. and closedly spaced to one another with sufficient space between them for the screen to hold up under working conditions.

Except for its starting material feed hopper inlet at one side of it, the rest of the chamber's cover is arcuate and convex upwardly with a radius (from the axis of the operating shaft) sufficient for the rotating arms to have a 0.762 mm. clearance from the inwardly facing surfaces of a plurality (e.g., three) pre-breaker bars (about 20.32 cm. long and 6.35 mm. wide) protruding for 3.175 mm. along their entire length into the interior of the comminuting chamber, and extending spaced apart from one another and parallel to the axis of the operating shaft.

The selected driving pulley on the operating shaft is connected by driving belts extending from a motor shaft drive pulley and can be operated at speeds embracing the range of from about 4,700 to about 8,000 r.p.m., and more effectively from about 5,000 to about 7,500 r.p.m.

The invention is illustrated by, but not restricted to, the following example:

EXAMPLE 1

Approximately 400 liters of flexible polyurethane foam in the form of pieces, about 25.4 mm. in length and also in width by 12.7 mm. in thickness, and having a density of approximately 2 pounds per cubic foot, were comminuted in a comminuting machine (as described on page 6, line 5 to page 9, line 8) equipped with an input feeder approximately 10 cm. in diameter by 7.5 cm. long and having a bottom arcuate screen with rectangular slots 12.7 mm. long by 0.25 mm. wide and arranged in a herringbone array. The rotor was set to run at approximately 7,500 r.p.m. and the feeder set to charge the flexible polyurethane foam pieces at a rate of about 35 liters per every 5 minutes. The flexible polyurethane foam pieces to be introduced into the feeder were wetted with sufficient water to substantially cover their outer surface. Simultaneously, water was injected into the comminuting zone through two 2.16 mm. diameter jet orifices at a rate of approximately 7.6 liters per minute. The mixture of flexible polyurethane foam micro-bits leaving the bottom screen of the comminuting chamber was collected in open drums with bottom drain plugs, wherein the free water settled to the bottom and the polyurethane micro-bits with the bound water held by them in a proportion of 1 part of polyurethane micro-bits to 3 parts of water, due to entrapped air, rose on top of the free water. The polyurethane micro-bits were recovered and dried in an oven at a temperature of 210° F.

Hand sample paper sheets prepared by mixing the polyurethane micro-bits with a usual water suspension of bleached wood pulp in the usual test made in papermaking laboratories produced a product having significant improvements in tear and tensile strength over that of comparable sheets made with the bleached wood pulp alone in the same concentration of that of the pulp taken together with the flexible polyurethane foam micro-bits. The properties of these papers are set forth below.

TABLE 1

|  | Blank | 5% B* | 10% B | 40% B | 80% B |
|---|---|---|---|---|---|
| Tensile Strength lb./in. | 19.5 | 25.4 | 18.8 | 3.2 | 10.3 |
| Tear Strength lb./in. | 122 | 138 | 176 | 172 | 165.3 |
| Mullen | 46 | 35 | 48 | 31 | 34 |
| Brightness-% | 81.7 | 79.4 | 79.3 | 77.8 | 76.0 |
| Opacity-% | 90.1 | 87.2 | 88.7 | 90.3 | 91.3 |
| Basis Wt. lbs./1,300 ft.² | 81.5 | 84.6 | 87.1 | 108.4 | 130.6 |

TABLE 1-continued

|  | Blank | 5% B* | 10% B | 40% B | 80% B |
|---|---|---|---|---|---|
| Caliper-in. × $10^{-3}$ | 8.5 | 10.0 | 11.1 | 16.4 | 23.6 |

*B stands for flexible polyurethane foam micro-bits.

Figure 2:
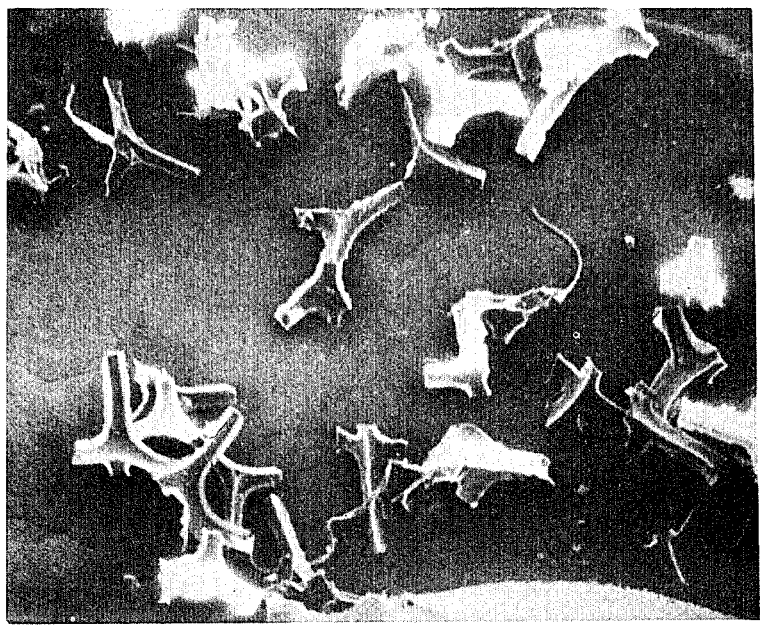
FIG. 2 is a SEM (scanning electron microscope) photograph, at a magnification of 200, of the micro-bit products of this invention.
Figure 3:
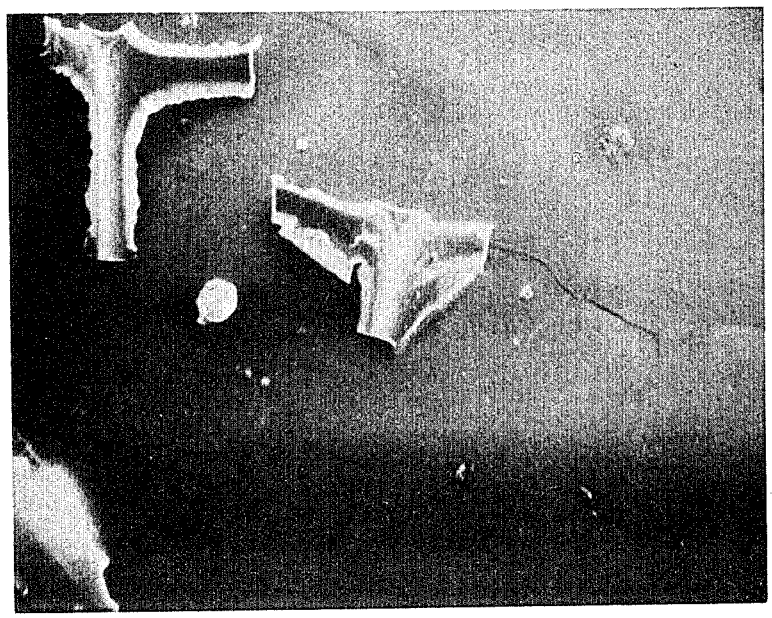
FIG. 3 is a SEM of two micro-bits of this invention at a magnification of 200.
Figure 4:
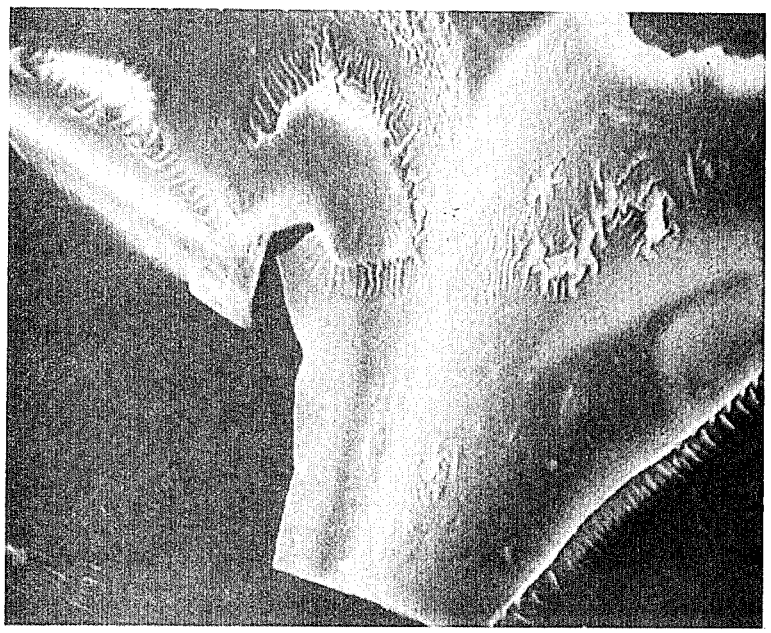
FIG. 4 is a SEM of the micro-bit product shown in the center portion of FIG. 3. The magnification is 500.

FIG. 2 shows the overall structure of the flexible polyurethane foam micro-bits provided by the method of the invention. They range in size from about 160 to about 100 microns in the overall maximum dimension. They exhibit a relative similarity from micro-bit to micro-bit and the micro-bits may appear as tripodal particles with generally uneven length legs, as seen in FIGS. 2 and 3. The overall dimensions of the micro-bits can be controlled by changes in the flexible polyurethane foam formulation made to effect the cell size.

FIG. 3 shows the ragged peripheral boundaries of the flexible polyurethane foam micro-bits which have resulted from the fracture and tearing of cell windows. These two mechanisms of cell window destruction are evidenced by the fluted tear line structure of the central micro-bit's right-hand boundary versus the jagged fracture line of the remaining boundaries, as seen in FIG. 5. Modification of the mechanism of cell window destruction and the peripheral boundaries should be easily affected by changes in the flexible polyurethane foam formulation.

The flexible polyurethane foam micro-bits of this invention when admixed in, or serving as, a filter medium are effective to remove phenol from aqueous solution, e.g., streams of industrial effluent, and also from gaseous streams.

While the invention has been explained by detailed description of certain specific embodiments of it, it is understood that various modifications and substitutions may be made in them within the scope of the appended claims which are intended also to cover equivalents of these embodiments.

What is claimed is:

1. The method of preparing, from pieces of flexible polyurethane foam, micro-bits of flexible polyurethane foam which show under magnification
   (a) broken and inter-connected strand portions from adjacent cells of said flexible foam;
   (b) said broken and inter-connected strand portions being tripodal particles with generally uneven length legs;
   (c) said strand portions having hook-like projections, indentations and flutes extending therefrom, said hook-like projections, indentations and flutes having been formed by the destruction of the cell windows of said flexible foam; and
   (d) said strand portions being characterized by a substantially total absence of intact cell windows, which method comprises feeding into a confined comminuting zone having a feed inlet and including a plurality of rotatable impact surfaces spaced apart from one another pieces of flexible polyurethane foam and a cooling fluid inert to the flexible polyurethane foam; repeatedly impelling the polyurethane foam pieces in the cooling fluid through a circular path by rotating said impact surfaces at from about 4700 to about 8000 revolutions per minute and thus by said impact surfaces driving said polyurethane foam pieces against corner-shaped edges of a plurality of orifices arranged in arcuate screening array in said comminuting zone, said orifices being from substantially circular ranging from about 0.102 to about 3.175 millimeters in diameter, to substantially rectangular, ranging from about 0.254 to about 3.175 millimeters in width and from about 3.81 to about 12.7 millimeters in length, thereby comminuting said pieces of flexible polyurethane foam and providing microbits of the flexible polyurethane foam; said cooling fluid being provided in an amount sufficient to maintain the temperature in the comminuting zone below that at which degradation of said flexible polyurethane foam would occur.

2. The method as claimed in claim 1, wherein the cooling fluid is water.

3. The method as claimed in claims 1 or 2, wherein the cooling fluid or cooling water is fed at a rate and temperature to maintain the polyurethane below 149° C.

4. The method as claimed in claim 3, wherein said impact surfaces are axially and also angularly spaced apart from one another.

5. The method as claimed in claim 4, wherein said flexible polyurethane foam shredded pieces in said comminuting zone are driven by said impact surfaces alternately (i) to and against cornered edges of at least one pre-breaking surface located between said feed inlet and said plurality of orifices and spaced circumferentially away from said orifices and radially similarly out of range of said impact surfaces as are said orifices, and (ii) to and against said orifices.

6. The method as claimed in claim 5, wherein there is a plurality of said pre-breaking surfaces and they are elongated and extend for about the width of said comminuting zone parallel to the axis of said circular path and are circumferentially spaced apart from one another about said axis.

* * * * *

UNITED STATES PATENT AND TRADEMARK OFFICE
CERTIFICATE OF CORRECTION

PATENT NO. : 4,304,873
DATED : December 8, 1981
INVENTOR(S) : Max Klein

It is certified that error appears in the above-identified patent and that said Letters Patent are hereby corrected as shown below:

Column 3, line 60, "by" should be --be--;

Column 4, line 66, "closedly" should be --closely--;

Column 5, line 61, "3.2" should be --13.2--.

Signed and Sealed this

Third Day of August 1982

[SEAL]

Attest:

Attesting Officer

GERALD J. MOSSINGHOFF
Commissioner of Patents and Trademarks